US012682767B1

(12) United States Patent
Katz et al.

(10) Patent No.: US 12,682,767 B1
(45) Date of Patent: Jul. 14, 2026

(54) DRONE FLIGHT MANAGEMENT

(71) Applicant: UIPCO, LLC, San Antonio, TX (US)

(72) Inventors: Brian Howard Katz, San Antonio, TX (US); Surender Kumar, Palatine, IL (US); Jeffrey Thomas Cavanaugh, Sun City, AZ (US); Daniel Diaz, San Antonio, TX (US); Jennifer Holly Nance, San Antonio, TX (US); Robert Christian Law, Plano, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 127 days.

(21) Appl. No.: 18/408,885

(22) Filed: Jan. 10, 2024

Related U.S. Application Data

(60) Provisional application No. 63/479,214, filed on Jan. 10, 2023.

(51) Int. Cl.
*G08G 5/32* (2025.01)
*G08G 5/26* (2025.01)
(Continued)

(52) U.S. Cl.
CPC ................. *G08G 5/32* (2025.01); *G08G 5/26* (2025.01); *G08G 5/55* (2025.01); *G08G 5/57* (2025.01)

(58) Field of Classification Search
CPC .. G08G 5/32; G08G 5/26; G08G 5/55; G08G 5/57
See application file for complete search history.

(56) References Cited

U.S. PATENT DOCUMENTS 4,040,744 A * 8/1977 Schertz .................... F41G 3/225 356/141.5
8,244,469 B2 * 8/2012 Cheung ................ G05D 1/0038 701/120

(Continued)

FOREIGN PATENT DOCUMENTS

CN 108025808 A * 5/2018
CN 107749079 B * 3/2020 ............. G01C 21/20

(Continued)

OTHER PUBLICATIONS

"Combining temporal planning with probabilistic reasoning for autonomous surveillance missions;" Bernardini et al., Autonomous Robots, 41(1), 181-203; Dec. 28, 2015. (Year: 2015).*

(Continued)

*Primary Examiner* — Khoi H Tran
*Assistant Examiner* — Jorge O Peche
(74) *Attorney, Agent, or Firm* — Plumsea Law Group, LLC

(57) ABSTRACT

A system can generate a flight path to ensure a drone is visible to at least one observer at all times in order to meet flight regulations or to provide additional monitoring of the drone in-flight. Locations of one or more observers are retrieved from devices associated with the observers. Based on these observer locations, a flight routing system can automatically generate optimal flight paths that meet the line of sight constraints as well as possibly other criteria (such as minimal distance and/or minimal flight time). In scenarios where there are no flight paths that meet the line of sight constraints, the flight routing system can find optimal flight paths with new target observing locations. These target observing locations are then transmitted to the observers with the expectation that the observers will move to those locations.

20 Claims, 8 Drawing Sheets

(51) Int. Cl.
*G08G 5/55* (2025.01)
*G08G 5/57* (2025.01)

(56) References Cited

U.S. PATENT DOCUMENTS

| | | | | |
|---|---|---|---|---|
| 8,525,088 | B1 * | 9/2013 | Ell | F41G 7/2226 244/3.17 |
| 9,588,516 | B1 * | 3/2017 | Gurel | G05D 1/0033 |
| 9,618,940 | B1 * | 4/2017 | Michini | G08G 5/55 |
| 10,102,758 | B1 * | 10/2018 | Beaurepaire | B64U 10/14 |
| 11,854,413 | B2 * | 12/2023 | Gurel | G06T 5/70 |
| 11,897,607 | B2 * | 2/2024 | Michini | B64C 39/024 |
| 12,228,938 | B2 * | 2/2025 | Suvitie | G05D 1/661 |
| 2004/0249519 | A1 * | 12/2004 | Frink | B64D 45/0031 701/9 |
| 2005/0004723 | A1 * | 1/2005 | Duggan | G05D 1/0061 701/13 |
| 2010/0017047 | A1 * | 1/2010 | Sanders-Reed | G06F 3/14 701/3 |
| 2011/0118907 | A1 * | 5/2011 | Elkins | B64B 1/00 701/3 |
| 2016/0035224 | A1 * | 2/2016 | Yang | G08G 5/723 701/23 |
| 2017/0069214 | A1 * | 3/2017 | Dupray | G08G 5/56 |
| 2017/0162063 | A1 * | 6/2017 | Kuhara | G08G 5/26 |
| 2017/0192424 | A1 * | 7/2017 | Poole | G01C 21/20 |
| 2018/0046246 | A1 * | 2/2018 | Nishihashi | B60K 35/22 |
| 2018/0114450 | A1 * | 4/2018 | Glaab | G08G 5/34 |
| 2018/0229842 | A1 * | 8/2018 | Stabler | G05B 23/0286 |
| 2018/0327091 | A1 * | 11/2018 | Burks | B64U 50/13 |
| 2019/0103032 | A1 * | 4/2019 | Sasaki | G08G 5/74 |
| 2019/0108680 | A1 * | 4/2019 | Querejeta Masaveu | G08G 5/59 |
| 2019/0156684 | A1 * | 5/2019 | Pohl | G08G 5/55 |
| 2019/0238658 | A1 * | 8/2019 | Shimizu | H04W 4/46 |
| 2019/0265705 | A1 * | 8/2019 | Zhang | G05D 1/0022 |
| 2019/0300172 | A1 * | 10/2019 | Di Benedetto | G08G 5/55 |
| 2020/0175882 | A1 * | 6/2020 | Singh | G05D 1/617 |
| 2020/0265726 | A1 * | 8/2020 | Dupray | G08G 5/25 |
| 2020/0286391 | A1 * | 9/2020 | Beaurepaire | G08G 5/57 |
| 2020/0346750 | A1 * | 11/2020 | Hu | G05D 1/106 |
| 2020/0393852 | A1 * | 12/2020 | Rozenberg | G08G 5/57 |
| 2021/0012666 | A1 * | 1/2021 | Schmidt | G05D 1/0676 |
| 2021/0021804 | A1 * | 1/2021 | Yang | H04N 13/307 |
| 2022/0121222 | A1 * | 4/2022 | Vernon | G08G 5/22 |
| 2022/0270495 | A1 * | 8/2022 | Pele | G08G 5/76 |
| 2024/0304097 | A1 * | 9/2024 | Madden | B64C 39/024 |

FOREIGN PATENT DOCUMENTS

| | | | | | |
|---|---|---|---|---|---|
| CN | 119414856 | A | * | 2/2025 | G05D 1/644 |
| CN | 119512167 | A | * | 2/2025 | G05D 1/695 |
| CN | 120151930 | A | * | 6/2025 | G06F 18/23213 |
| CN | 120180522 | A | * | 6/2025 | G06N 3/084 |
| CN | 120726208 | A | * | 9/2025 | G06V 10/26 |
| CN | 121230739 | A | * | 12/2025 | |
| EP | 2966633 | A2 | * | 1/2016 | B64D 47/02 |
| EP | 3399666 | A1 | * | 11/2018 | G01S 19/13 |
| EP | 3438775 | A1 | * | 2/2019 | B64C 13/20 |
| EP | 3705849 | A2 | * | 9/2020 | G08G 5/723 |
| EP | 3809231 | B1 | * | 10/2023 | G08G 5/80 |
| KR | 20220027218 | A | * | 3/2022 | B64U 10/13 |
| WO | WO-2021090312 | A2 | * | 5/2021 | G01S 1/00 |

OTHER PUBLICATIONS

"A Survey on Spectrum Management for Unmanned Aerial Vehicles (UAVs)," Jasim et al., IEEE Access (vol. 10, 2022, pp. 11443-11499); Jan. 1, 2022. (Year: 2022).*

"Application of visual and instrument flight rules to remotely piloted aircraft systems: A conceptual approach;" Finke et al., 2016 IEEE/AIAA 35th Digital Avionics Systems Conference (DASC) (2016, pp. 1-10); Sep. 1, 2016. (Year: 2016).*

* cited by examiner

DRONE FLIGHT MANAGEMENT

CROSS-REFERENCE TO RELATED APPLICATIONS

This application claims the benefit of Provisional Patent Application No. 63/479,214 filed Jan. 10, 2023, and titled "Drone Flight Management," which is incorporated by reference herein in its entirety.

TECHNICAL FIELD

The present disclosure generally relates to drones, and in particular to flight paths for drones.

BACKGROUND

The use of drones by both private individuals and commercial entities has increased dramatically in recent years. Adapting drones to new industries requires navigating various regulatory schemes imposed by the Federal Aviation Association, as well as national, state, and local laws (and regulations) pertaining to drones. In many places, regulations require that a drone operator, or other observer, has line of sight (a direct view) of the drone at all times. This can make it more difficult to utilize drones for a variety of activities which require the drone to fly long distances, or through areas with many obstructions to line of sight. Even in situations where regulations do not prohibit flying the drone outside of line of sight, there may be situations where it is still desirable to have observers monitoring the drone.

There is a need in the art for a system and method that addresses the shortcomings discussed above.

SUMMARY

In some aspects, the techniques described herein relate to a method, including: receiving a first location and a second location; identifying a set of devices disposed within a geographic region that includes the first location and the second location; retrieving device locations for each device in the set of devices; and generating a flight path for a drone between the first location and the second location, wherein generating the flight path includes considering line of sight conditions between locations along the flight path and the device locations.

In some aspects, the techniques described herein relate to a method, including: receiving a first location and a second location; identifying a set of devices disposed within a geographic region that includes the first location and the second location; retrieving device locations for each device in the set of devices; generating a target observing location for a selected device in the set of devices; generating a flight path for a drone between the first location and the second location, wherein generating the flight path includes considering line of sight conditions between locations along the flight path and the target observing location; sending a message including the target observing location to the selected device; and sending the flight path to the drone.

In some aspects, the techniques described herein relate to a system for drones, including: one or more processors; and a non-transitory computer-readable media storing instructions that can be executed by the one or more processors to: receive a first location and a second location; identify a set of devices disposed within a geographic region that includes the first location and the second location; retrieve device locations for each device in the set of devices; and generate a flight path for a drone between the first location and the second location, wherein generating the flight path includes considering line of sight conditions between locations along the flight path and the device locations.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
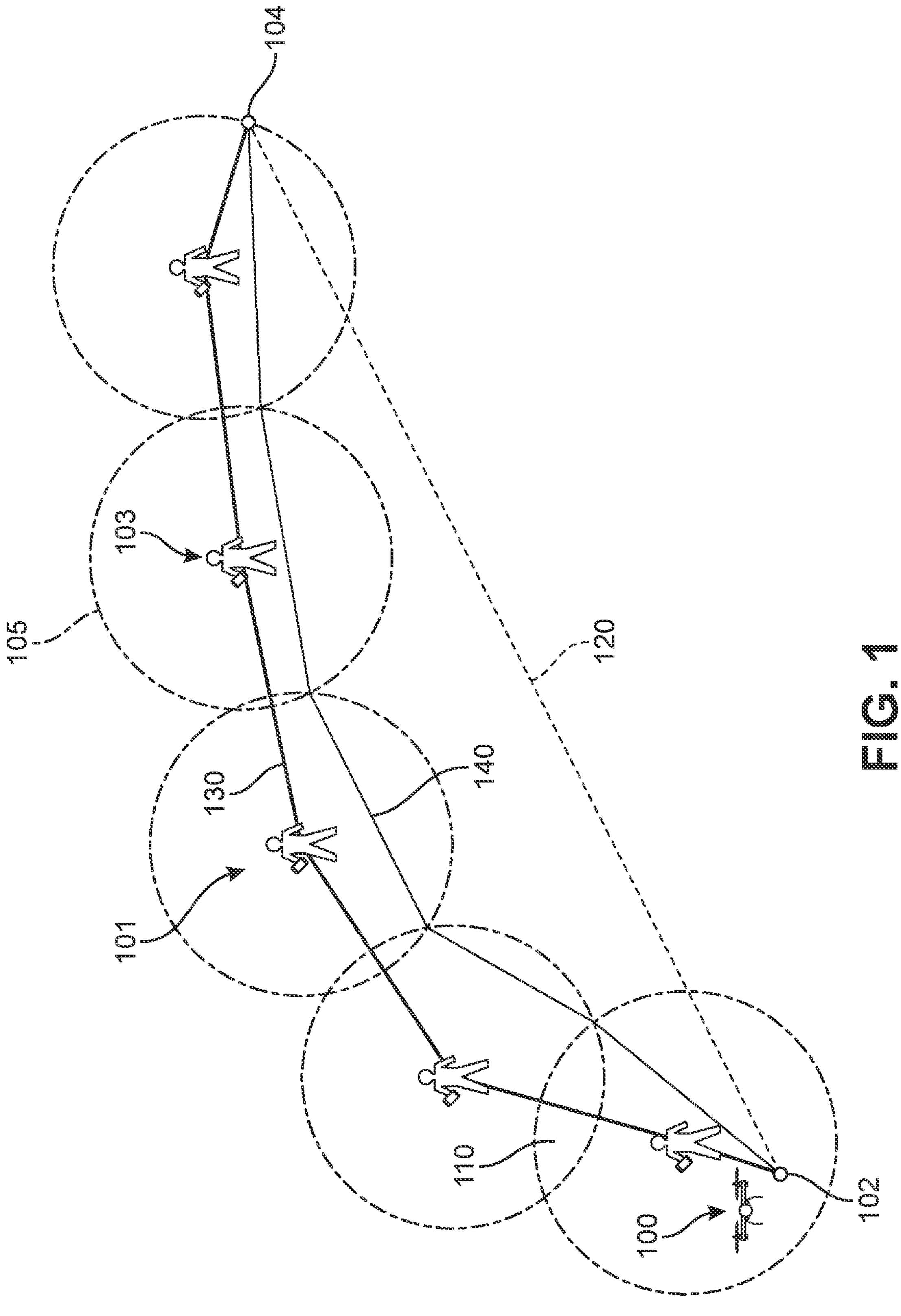
FIG. 1 is a schematic view of multiple possible flight paths for a drone between two locations, according to an embodiment.

The embodiments provide systems and methods for generating flight paths for drones that ensure the drone is visible to at least one observer at all times. Locations of one or more observers may be inferred from the locations of devices associated with the observers (such as phones, tablets, or other devices). Based on these observer locations, and possibly other suitable information including geographic information, a flight routing system can automatically generate optimal flight paths that meet the line of sight constraints as well as possibly other criteria (such as minimal distance and/or minimal flight time and/or maximized battery conservation flights and/or air traffic proximity minimized flights). As part of generating optimal flight paths, the system can infer line of sight conditions. This includes inferring locations in a geographic area that are visible to at least one observer at all times. The system can also automatically update the flight paths in real time to accommodate changes in observer locations. In scenarios where there are no flight paths that meet the line of sight constraints, the flight routing system can find optimal flight paths with new target observing locations. These target observing locations are then transmitted to the observers or the observers' autonomous vehicle(s) with the expectation that the observers will move or be moved by their vehicle(s) to those locations. Such autonomous vehicles transporting the observer(s) could leverage any transportation modality—for example ground based transports, maritime surface or maritime submersibles, or airborne.

In some embodiments, observers may not be passive, but could comprise persons capable of helping to pilot a drone along the portion of the flight path for which they have line of sight. In such embodiments, when a drone becomes visible to the current observer, control of the drone could be handed off from either a previous observer or from an automated piloting system, to the current observer. This could be accomplished using controls provided via the same device used to locate the observer for flight planning. This can then be repeated once the drone passes into an area with a next observer who has line of sight, so that the control of the drone is passed along to that next observer. Such a configuration could be used to ensure that a drone is always being piloted by someone who has line of sight, as could be required in some jurisdictions. This configuration can also be useful when conditions are such that an automated flight path may need to be adapted on the fly with manual assistance. Control of a drone could be facilitated using an application running on a mobile device, as discussed in further detail below, using a stand-alone remote control device, or a combination of mobile device and stand-alone remote control device. Various terms used throughout the detailed description and in the claims are defined here for clarity.

As used herein, the term "drone" refers to any unmanned aircraft (or unmanned aerial vehicles) or ship that can operate autonomously and/or via remote control. Exemplary types of UAVs include, but are not limited to: multi rotor drones (such as tricopters, quadcopters, and hexacopters), fixed wing drones, single rotor drones, and fixed wing hybrid VTOL (vehicle take-off and landing) drones.

The term "flight path," as used herein, refers to an actual or planned course (or route) of an aircraft. The term "flight path information" may refer to any information about the flight path. For example, flight path information may comprise a subset of points along the flight path from which the full flight path could be constructed.

The term "observer," as used herein, refers to any person actively observing, or capable of observing, a drone. The term "active observer" may specify persons who are actively observing (or looking for) a drone. The term "potential observer" may refer to persons who might be available to observe a drone. In some embodiments, observations may not be made directly by persons, but could be captured by cameras already located (or relocatable) along a drone's flight path. For example, during a natural disaster it may not be possible to have people observe at all necessary locations along a potential flight path. In some cases, therefore, a system could use surveillance cameras mounted on municipal/city buildings and or cameras mounted on public safety (Police/Fire/EMS) or Public Service vehicles as observing devices. The camera feeds, monitored possibly by other automated systems, could act directly as observers in jurisdictions where regulations permit this. The locations of fixed cameras can be obtained from public databases or from real-time GPS coordinates of service or safety vehicles where the cameras are mounted.

The term "region of visibility" may be used to refer to the collection of points in a geographic space that are visible to a given observer. Put another way, the region of visibility refers to all the points in a geographic space that are within line of sight of the observer. As an example, an observer looking at a mountain could see the mountain itself, but not objects behind the mountain (which are also below the top of the mountain). In this example, the mountain would be in the observer's region of visibility but anything behind the mountain would not be.

FIG. 1 is a schematic view of possible flight paths (or route) for a drone between two locations. In particular, the different flight paths for a drone 100 are between a first location 102 and a second location 104. For purposes of clarity, the flight paths are shown in two-dimensions, but it may be appreciated that flight paths may generally indicate the path of a drone in three dimensions as it flies between two locations. Also shown in FIG. 1 are the locations of various observers 101. Observers 101 may be able to observe a drone during flight. Moreover, for clarity, the region of visibility of each observer is indicated with a dotted circle centered on that particular observer. For example, a first observer 103 has a first region of visibility 105. It may be presumed, for this example, that observers cannot see anything outside of their respective region of visibility. Areas where two regions of visibility overlap (such as area 110) may be visible to both of the two corresponding observers.

An exemplary direct flight path 120 (shown with a dotted line) indicates a straight-line path between first location 102 and second location 104. This path may comprise a shortest distance flight path between first location 102 and second location 104. As shown, a majority of flight path 120 is located outside of the regions of visibility of observers 101. In other words, for a majority of the flight, the drone will not be within line of sight of any observers.

Another flight path 130 is also shown. Unlike direct flight path 120, flight path 130 takes a more indirect route between first location 102 and second location 104. As seen in FIG. 1, flight path 130 has the property that each point (location) along flight path 130 is within the viewing area of at least one observer. Thus, flight path 130 may be more useful than direct flight path 120, since flight path 130 meets regulations for maintaining line of sight with the drone at all times during its flight.

Another flight path 140 is also shown. Like flight path 130, each location along flight path 140 is also within the region of visibility of at least one observer. However, flight path 140 is optimized to also minimize the total length of the flight path (or, alternatively, to minimize the total time in flight for the drone).

Other routes may also be considered by the system, including routes that account for necessary changes in altitude to avoid hazards or otherwise adapt to environmental conditions. As an example, another flight path (not shown) could include a portion of reduced altitude that accounts for a fog line, to ensure visual line of sight regulations are satisfied. As another example, another flight path (not shown) could include a portion of increased altitude that accounts for air traffic or mountains in a particular area.

Figure 2:
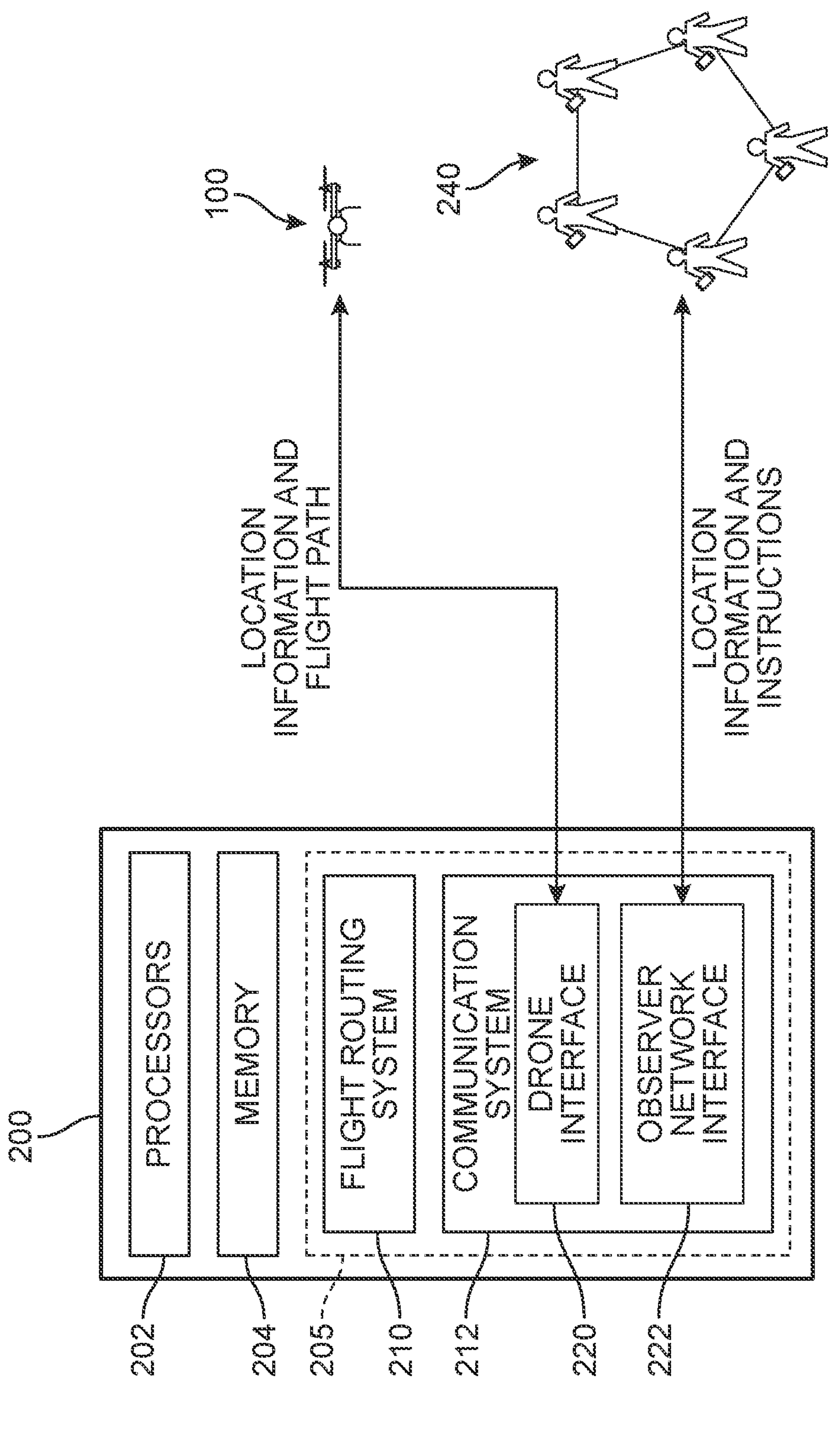
FIG. 2 is a schematic view of a computing device, according to an embodiment.

FIG. 2 is a schematic view of a computing device 200, according to an embodiment. Computing device 200 may comprise processors 202 and memory 204. Memory 204 may comprise a non-transitory computer-readable media storing instructions that can be executed by processors 202. Computing device 200 could comprise any type of computing device including a desktop computer, a laptop computer, a mobile phone, a tablet computing device, or any other suitable computing device.

Computing device 200 may also include a flight routing system 210 and a communication system 212, components of which could be storied in memory. In some cases, flight routing system 210 and communication system 212 may collectively comprise a flight management system 205. Flight routing system 210 is configured to generate flight paths for drones. More specifically, flight routing system 210 is configured to generate flight paths optimized for particular constraints, such as line of sight constraints, flight distance constraints, time of flight constraints, and/or other suitable constraints.

Communication system 212 facilitates communication with other systems, including systems external to computing device 200. Communication system 212 may include both hardware and software modules that facilitate communication. Communication system 212 further includes a drone interface 220 that facilitates communication with drones (for example, drone 100). For example, drone interface 220 may be used to send a flight path (or flight path information) to drone 100. Moreover, in some embodiments, the location of drone 100 could be retrieved by drone interface 220. Communication between drone interface 220 and drone 100 could occur over any suitable networks. These could include, but are not limited to, local area networks, wide area networks, cellular networks, satellite-based networks, or any other suitable networks. In some cases, communication may be limited to instances when the drone is near device 200 (for example, prior to flight). In other cases, communication could occur over long distances, including while the drone is in flight. It may be appreciated that in at least some embodiments, computing device 200 could be disposed onboard of drone 100.

Communication system 212 may also include an observer network interface 222. Observer network interface 222 may be used to communicate with mobile devices that are used by drone observers. For example, observer network interface 222 may be used to send location information and instructions to one or more observers 240. In some embodiments, the locations of mobile devices for one or more observers 240 could be passed back to computing device 200 via observer network interface 222.

Figure 3:
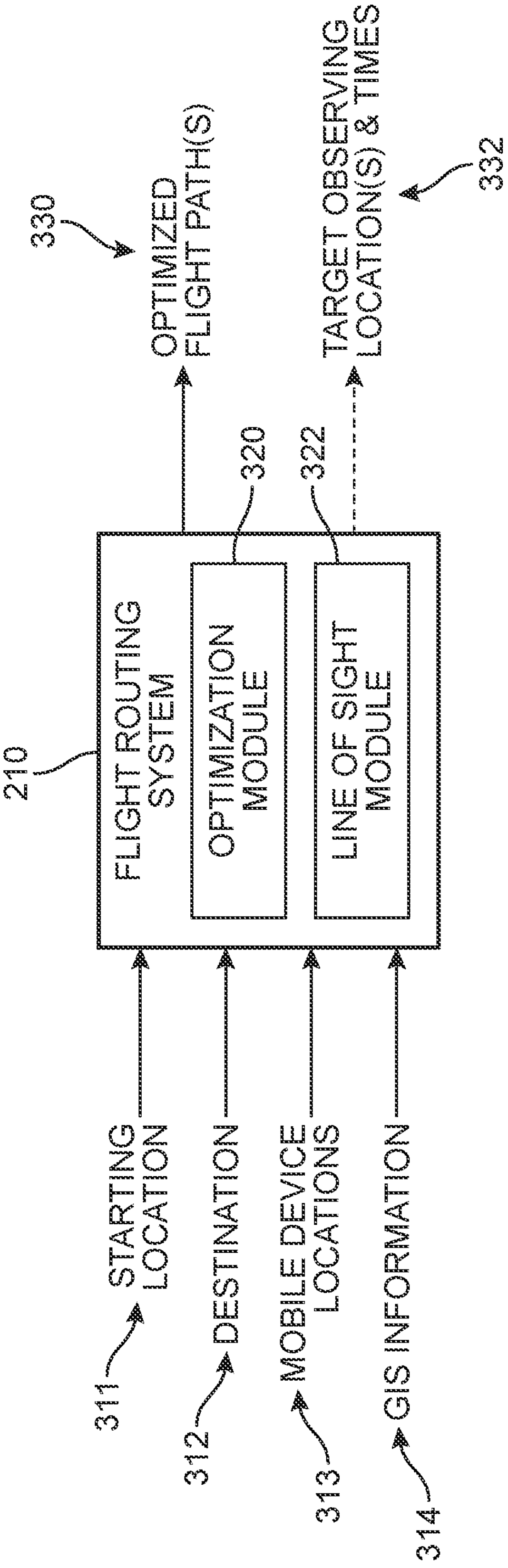
FIG. 3 is a schematic view of a flight routing system, according to an embodiment.
Figure 4:
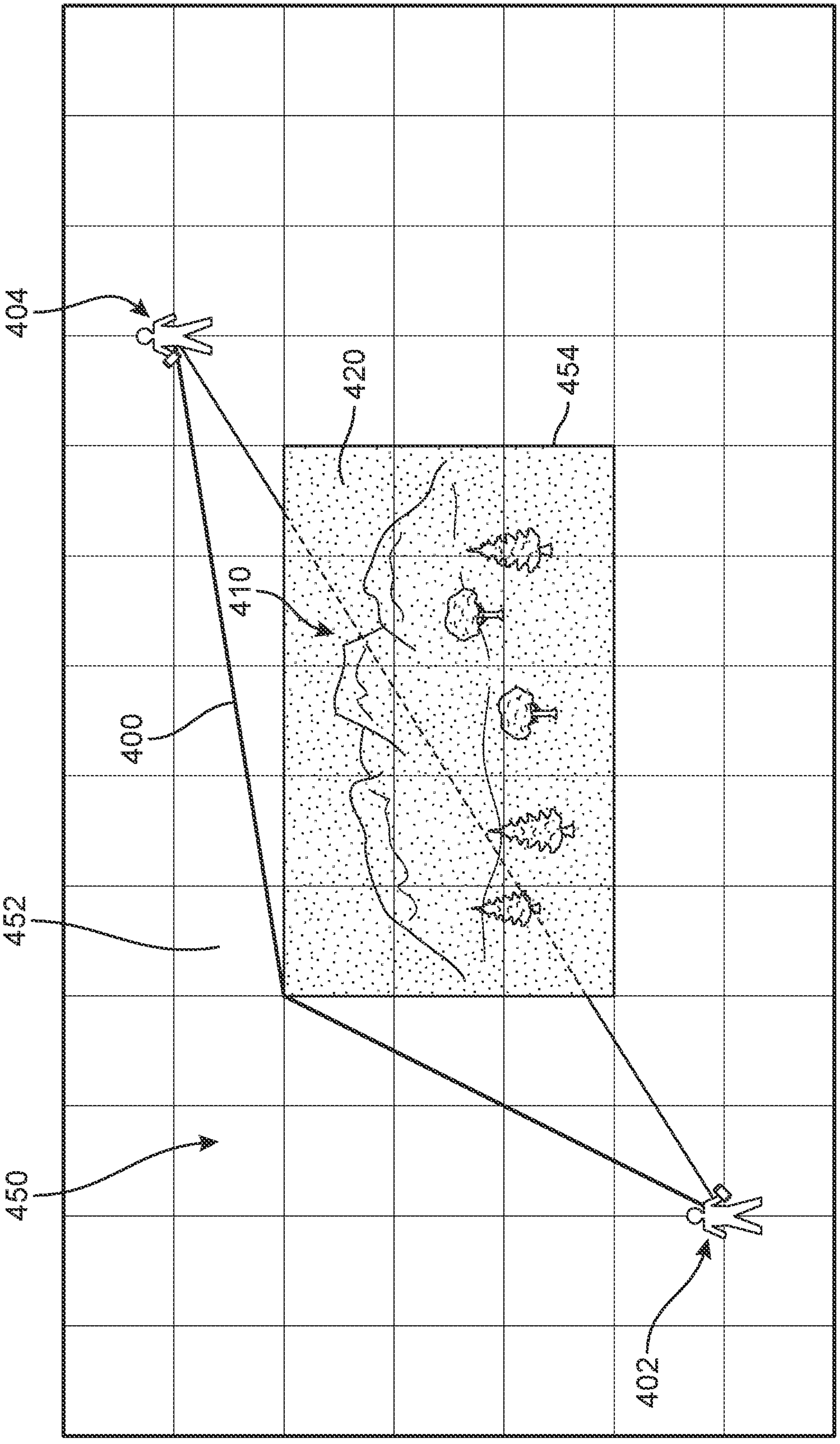
FIG. 4 is a schematic view of an alternate route around a geographic region that maintains line of sight between a drone and observers, according to an embodiment.

The operation of flight routing system 210 may be understood with reference to FIGS. 3 and 4. As seen in FIG. 3, flight routing system 210 may receive inputs including a starting location (first input 311), a destination (second input 312), mobile device locations (third input 313) corresponding to the locations of observers, and geographic information systems (GIS) information (fourth input 314).

Using an optimization module 320 and a line-of-sight module 322, flight routing system 210 may generate an optimized flight path (output 330). In some cases, output 330 comprises the entirety of the flight path. In other cases, output 330 comprises a subset of points from the flight path that could be used to reconstruct the entire flight path. Optionally, as discussed in further detail below, flight routing system 210 could also generate target observing locations and/or target observation times (output 332) that correspond to a given flight path.

Optimization module 320 may be configured to find optimal flight paths according to one or more constraints. For example, one constraint may be the requirement to limit flight paths to areas that are visible to one or more observers. Other optimization constraints can include, but are not limited to: flight distance constraints, flight duration constraints, time-of-day constraints, remaining battery capacity constraints, flight traffic constraints, weather related constraints, airspace restrictions constraints, or other suitable constraints.

Optimization module 320 could make use of one or more machine learning algorithms for flight optimization. These include various three-dimensional ("3D") planning algorithms such as, but not limited to: A*, Rapidly-Exploring Random Tree (RRT), Probabilistic Road Maps (PRM), Artificial Potential Field (APF), and Genetic or Evolutionary algorithms. These algorithms could be implemented along with various constraints, such as line of sight constraints, flight length/duration constraints, or other suitable constraints.

To construct line of sight constraints for the optimization problem of finding a best flight path, line of sight module 322 may be used. In some embodiments, line of sight module 322 can build a model of each observer's environment (that is, their local geographic region), which further demarcates areas that are visible (within line of sight) to each observer. In some embodiments, determining line of sight conditions can include making use of various kinds of real-time information regarding visibility in an area, or related conditions. For example, using either GIS information 314, or other real-time data from various sources (such as weather data providers), information about lower visibility in an area due to fires, fog, or other weather conditions, could be received and used as inputs to line of sight module 322. In particular, the visibility in a given area may be considered as a factor to estimating line-of-sight between observers and a drone for various possible locations. In particular, for low visibility conditions, the maximum distance between the drone and the observer will generally be decreased to ensure good line of sight, compared to maximum distance required to maintain line of sight between the drone and the observer in high visibility conditions. Thus, the optimal flight paths generated by the system will vary according to visibility information or other suitable environmental information.

A clarifying example is shown in FIG. 4. In this situation, a first observer 402 and a second observer 404 may be separated by a large mountain range 410 within a broader geographic region 450. Both observers may have limited line of site to the area immediately around mountain range 410. To account for this lack of visibility, line of sight module 322 may model geographic region 450 as a larger region of visibility 452 with a smaller central region of non-visibility (bounded region 454). When considering possible flight paths through geographic region 450, therefore, light of sight module 322 considers only paths that are entirely within the region of visibility 452 and ignores flight paths that intersect/pass-through with bounded region 454.

In the example of FIG. 4, an alternative flight path 400 (or portion of a larger flight path) is generated by optimization module 320 based on the constraints imposed by line-of-sight module 322. Flight path 400 is the shortest path that avoids bounded region 420. Thus, a drone flying on flight path 400 would always be visible to at least one of first observer 402 and second observer 404.

Although this example depicts a flight path with two observers, a similar process can be used to divide any geographical region into regions of visibility and regions of non-visibility. Line of sight module 322 may decompose the geographic region into these sub-regions based on information about observer locations (along with starting/ending points of the route). Line of sight module 322 could use any suitable algorithms for identifying regions of visibility (or, conversely, regions of non-visibility). As one example, line of sight module 322 could use ray-tracing algorithms that may be used in projecting light in 3D animations.

It may be appreciated that determining a region of visibility for each observer could include using various kinds of input, including GIS information obtained from remote databases, measurement and/or imaging data obtained from an observer device, or other suitable sources of information.

Figure 5:
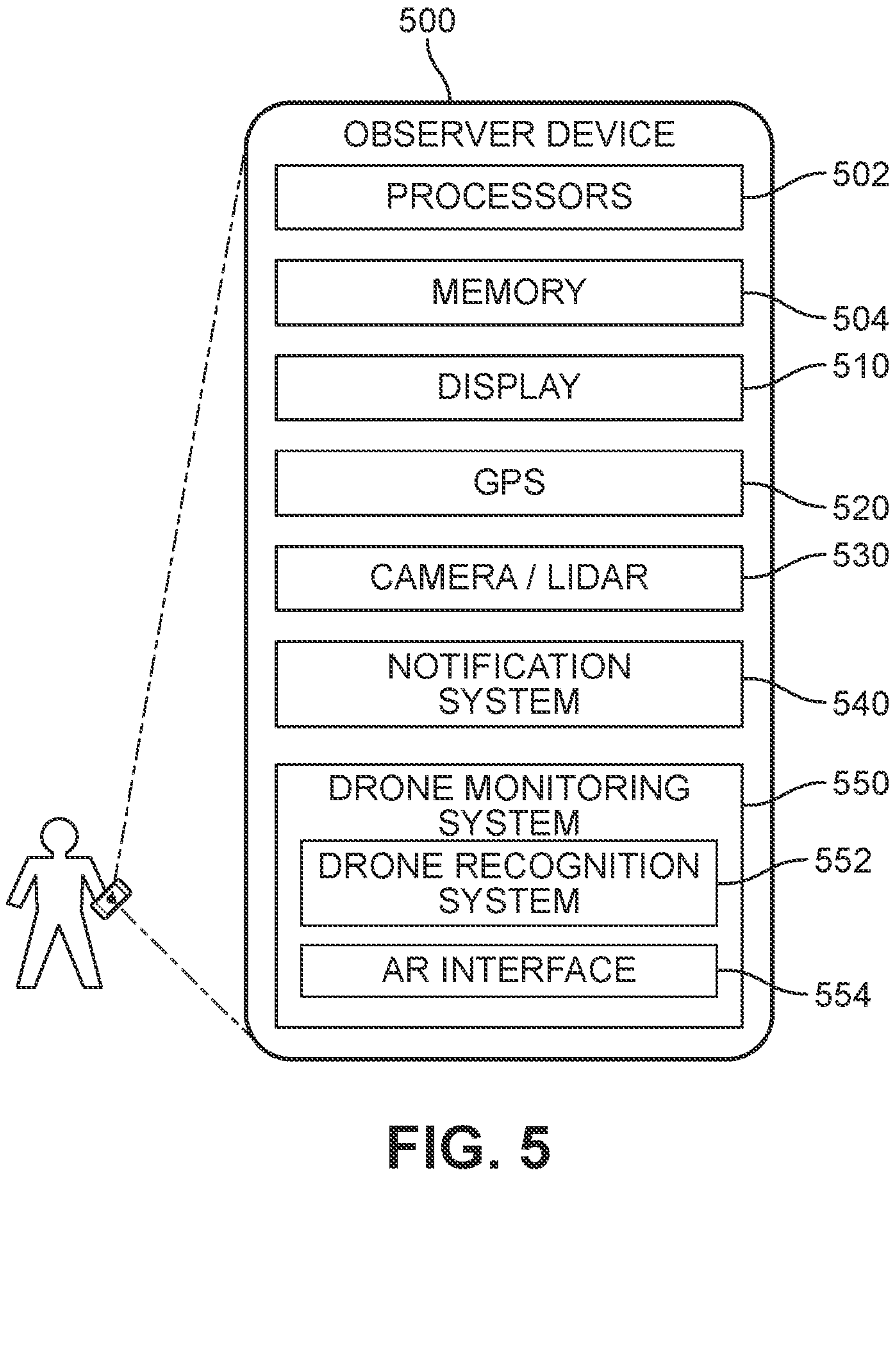
FIG. 5 is a schematic view of an observer device, according to an embodiment.

Embodiments can include provisions to facilitate observation of drones while they are in flight. FIG. 5 is a schematic view of an observer device 500. Such a device may be one of multiple devices that form part of an observer network, such as the network of one or more observers 240 (see FIG. 2). As used herein, an observer device is any device associated with an observer. Examples include an observer's smartphone, the observer's laptop, or any other device use, owned, and/or operated by an observer.

Observer device 500 could comprise any suitable computing device. Examples include but are not limited to: mobile phones (smartphones), tablet computing devices, laptop computers, wearable devices, or other suitable computing devices.

As seen in FIG. 5, observer device 500 may include one or more processors 502 and memory 504. Memory 504 may comprise a non-transitory computer-readable media storing instructions that can be executed by processors 502.

Observer device 500 may also include a display 510. Display 510 may be used for multiple purposes, including displaying navigation instructions to an observer. In some cases, the current location of an in-flight drone can be shown on display 510, for example, over a geographic map. In some cases, as discussed in further detail below, display 510 could be used as part of an augmented reality system to provide an augmented reality interface for observing drones.

Observer device 500 may include a GPS receiver 520. This allows observer device 500 to obtain a precise GPS location, which may be relayed back to computing device 200 (see FIG. 2) and/or other observer devices in the network.

In some embodiments, observer device 500 can include camera and/or LIDAR based sensors 530. These sensors could capture images of the sky that may be used to detect drones. Moreover, LIDAR sensors could be used to determine approximate distances between the drone and the observer. In some cases, sensors 530 could be used to capture information about a user's environment. Such information, including the sizes, locations, and distances of various features (mountains, buildings, etc.) could be used as input to a line-of-sight module (such as line of sight module 322 in FIG. 3). In particular, using size, location, and distance information about features in the observer's environment would allow a line of sight module to build a more accurate model of the observer's region of visibility.

Observer device 500 may also include notification system 540. Notification system 540 may provide notifications, alerts, and/or other information for an observer. These could include notifications about the current location of a drone, instructions for an observer, or other suitable information. Notifications could be provided as pop-up messages on the device, as audible messages, or any other suitable messages. As one example, a notification could alert an observer that a drone will be visible by the observer shortly. As another example, a notification could ask an operator of a device if they consent to being designated as an observer along the drone's flightpath. In this example, the user could indicate their acceptance (or not) of this responsibility in response to the notification.

Observer device 500 may also include a drone monitoring system 550. Drone monitoring system 550 may include provisions for actively detecting and tracking drones that are within line of sight of the observer device. Drone monitoring system 550 may further include a drone recognition system 552 and an augmented reality interface ("AR interface 554"). Drone recognition system 552 could include suitable software for detecting drones within images that might be captured by a camera of observer device 500. In some cases, drone recognition system 552 includes one or more trained machine learning models for detecting drones in images, including sequences of images from video. Exemplary machine learning models could include neural network-based models. In some cases, drone recognition system 552 could use convolutional neural networks (CNNs) to identify drones.

As already mentioned, some embodiments may provide a way for observers to take control of a drone when the observer has line-of-sight to the drone. In some embodiments, manual control of a drone could be enacted through a software interface of observer device 500. In some cases, a drone controller interface could be incorporated into drone monitoring system 550, or via a separate software module or application running on observer device 500. The drone controller interface could provide any suitable control buttons or elements, including virtual control sticks, a virtual power button for turning the drone on and off, a virtual return home button, a virtual camera button for manually capturing images with cameras onboard the drone, or other suitable virtual buttons or elements.

Figure 6:
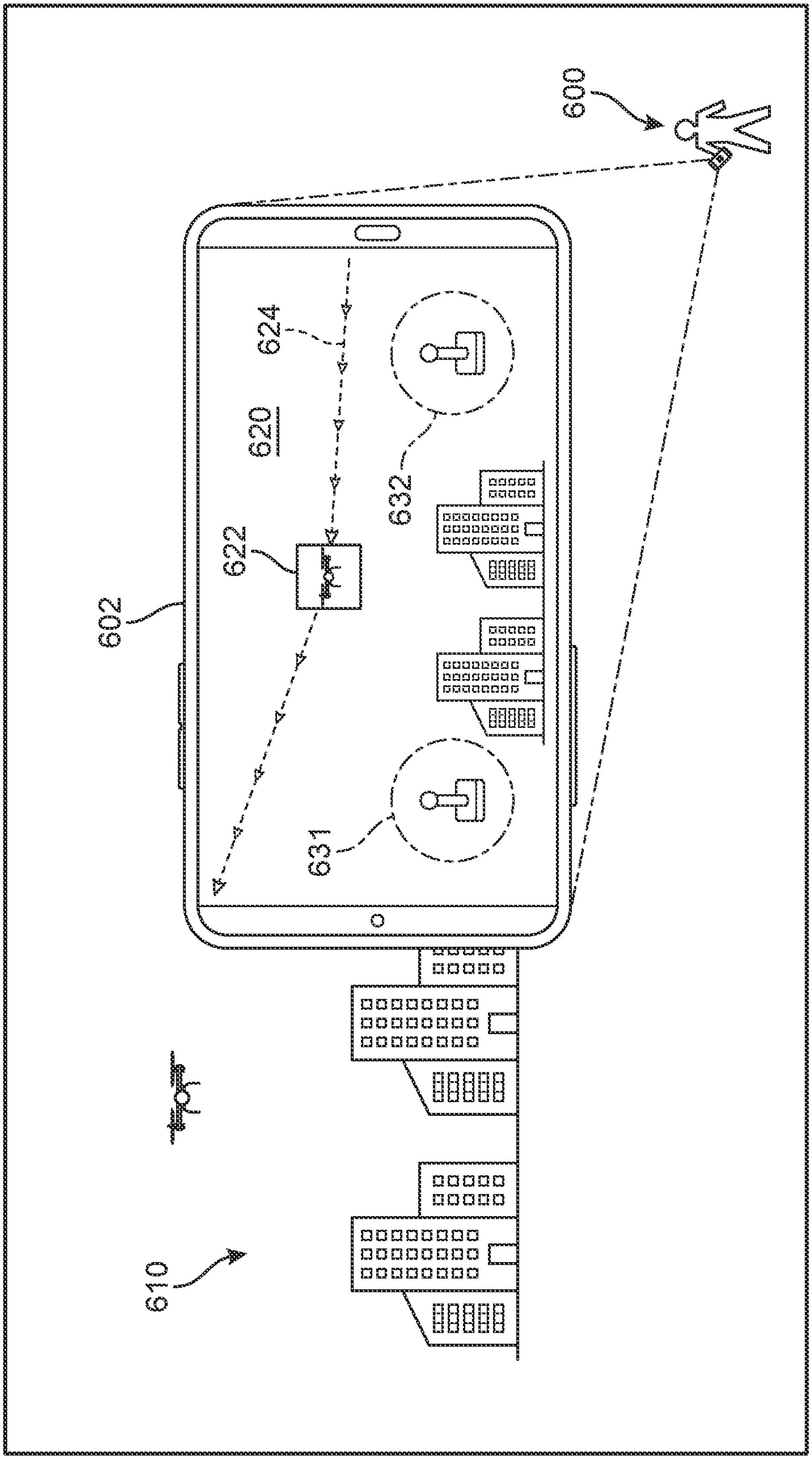
FIG. 6 is a schematic view of an augmented reality display for monitoring a drone, according to an embodiment.

AR interface 554 may comprise software for presenting an augmented reality view of an observer using observer device 500. An exemplary AR presentation is shown in FIG. 6. As seen in FIG. 6, an observer 600 uses device 602 to capture real-time video of a scene 610 that includes a drone and other elements such as buildings. Using machine learning to analyze captured images, along with information about the known flight path, device 602 presents AR elements on display 620. Specifically, drone AR element 622 identifies the drone, while flight path AR elements 624 identify the planned flight path. Using AR to highlight the drone and flight path helps an observer maintain line of sight and also confirm that the drone is maintaining its intended flight path. In embodiments where observers are able to manually control a drone when they have line of sight, AR interface 554 could provide optional virtual control sticks (such as first stick 631 and second stick 632), as well as any other suitable control buttons or elements (not shown).

Figure 7:
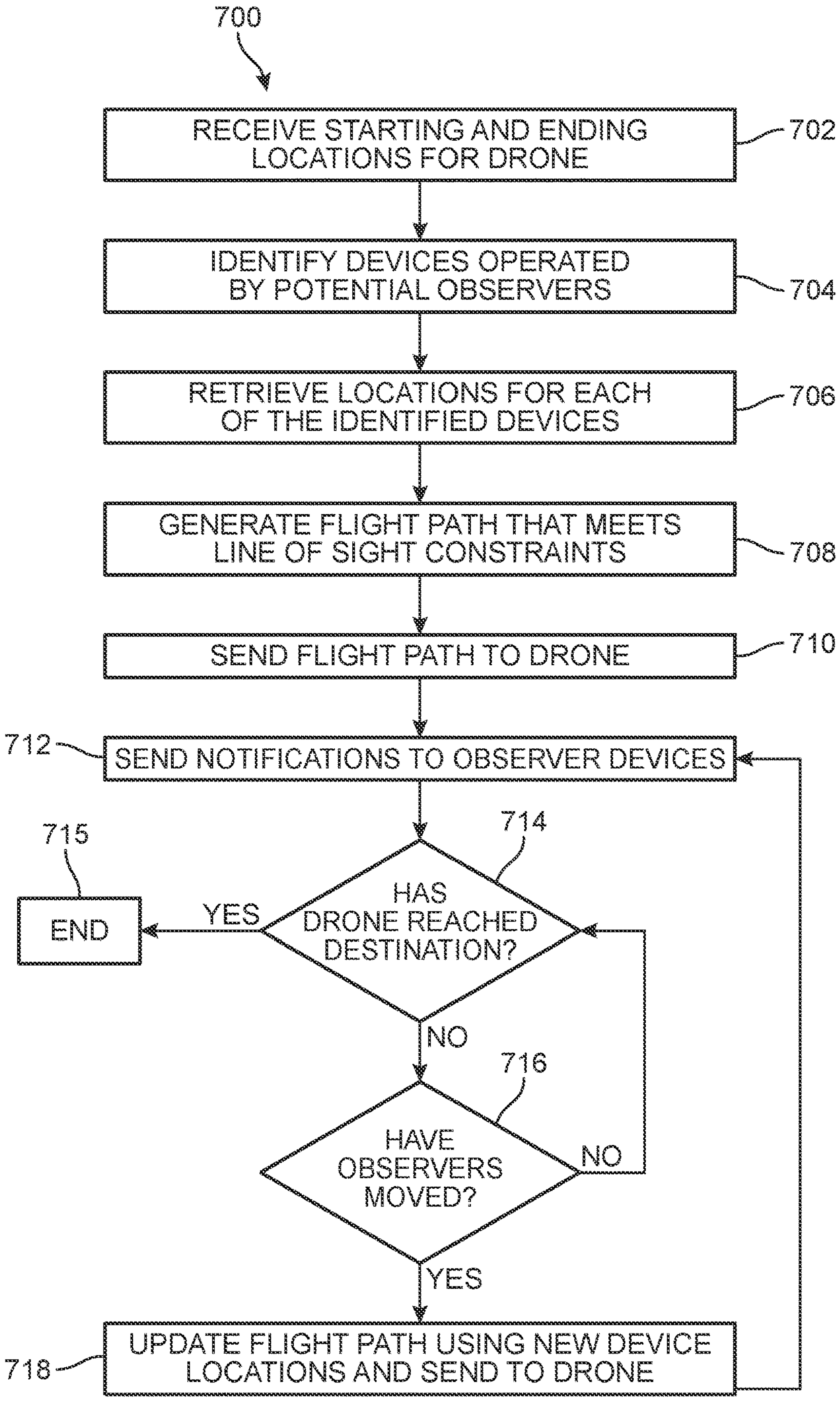
FIG. 7 is a schematic view of a process for generating and managing flight paths for drones, according to an embodiment.

FIG. 7 is a schematic view of a process 700 for generating and managing flight paths for drones. It may be appreciated that one or more of the following steps could be performed by a flight management system, such as flight management system 205 ("system 205") in FIG. 2. Moreover, it may be appreciated that one or more of the following steps could be optional in other embodiments.

In step 702, system 205 may receive starting and ending locations for a drone. That is, system 205 may receive a first location corresponding to a starting location for the drone and also a second location corresponding to a destination for the drone. The system can then take actions to generate a flight path, send the flight path to the drone (when the system is not onboard the drone), and/or update the flight path.

In step 704, system 205 identifies any devices that may be operated by potential observers. In some embodiments, system 205 locates devices within a predetermined geographic area. The size of the predetermined geographic area may be selected to encompass various possible flight paths between the first and second locations. In some embodiments, system 205 queries any suitable devices in the predetermined geographic area. In other embodiments, the system identifies only those devices within a predetermined geographic area that are registered as, or otherwise indicated to be, potential observers. As an example, users could register as potential observers with a third party either through a mobile application or other process. In some cases, potential observers simply install a suitable mobile application and are not required to formally register. During step 704, then, system 205 may query any devices running the relevant mobile application over one or more networks. Based on this identification/query, system 205 may determine a set of devices that may be used in the analysis.

To limit the set of devices (and potential observers) that are further considered in building the flight path, embodiments can include provisions for filtering out some devices. As an example, a system could send notifications to potential observers asking if they consent to observe an upcoming flight of a drone. As another example, a system could query information about a potential observer's schedule, for example, from a scheduling application running on the observer's device. If any scheduling information indicates that the observer may not be available during the estimated time when the drone may pass by the observer, the system could rule out that potential observer.

In step 706, system 205 retrieves the locations of the devices identified in step 704. For example, system 205 could query each device to retrieve each device's GPS location. Alternatively, system 205 could infer locations for one or more devices using other suitable methods. The device locations are then used as proxy locations for corresponding potential observers.

With the locations of all devices associated with potential observers known, system 205 can proceed to generate an optimal flight path in step 708. In particular, system 205 generates a flight path that are optimized for line of sight. This means that at each point along its flight path, a drone is within line of sight (that is, visible) to at least one potential observer. In some cases, the system finds a flight path such that there is "substantially always line of sight between the drone and an observer." That is, it may be the case that observers do not have line of sight for substantially short periods, such as a few seconds, along a given flight path. Such flight paths may still be allowed to provide some tolerance in constructing an optimal flight path.

After generating the flight path, system 205 could send the flight path to the drone in step 710. In addition, system 205 could send notifications to potential observers in step 712. These notifications may include information about the pending drone flight to alert observers to be on the look-out for the drone.

In some embodiments, prior to sending the flight path to the drone, system 205 could send messages requesting confirmation from one or more observers, to ensure that the selected observers consent to observing. If, for example, an observer does not consent, then the system may remove that observer from the set of observers and generate an alternative flight path.

In step 714, system 205 may check to see if the drone has reached its destination. This may be done by querying the drone, or another system in communication with the drone, for the drone's location. In some cases, system 205 could query one or more observer devices to check on the status of the drone.

If the drone has reached its destination, system 205 proceeds to step 715 where the process ends. Otherwise, system 205 proceeds to step 716. Here, system 205 determines if any of the observers have moved during the flight, for example, by querying the devices' GPS locations. In particular, system 205 checks for movement in observers located along parts of the flight path that the drone has not yet reached. If the observers have not moved in step 716, system 205 returns to step 714 to check if the drone has reached its destination again.

If system 205 detects that observers have moved in step 716, system 205 proceeds to step 718 to update the flight path using new device locations. During step 718, system 205 may also send the updated flight path to the drone. To save computing time, system 205 may only need to update the portion of the flight path that the drone has yet to fly along.

In some scenarios, it may not be possible to find a flight path that meets all constraints, including constraints relating to line of sight. In particular, it may be the case that for a given set of observer locations, the system cannot find a flight path such that the drone is always in line of sight of at least one observer. In such scenarios, it may be necessary to direct one or more observers to target observing locations. These are locations found by the system so that the system can generate a flight path that meets the line of sight constraints.

Figure 8:
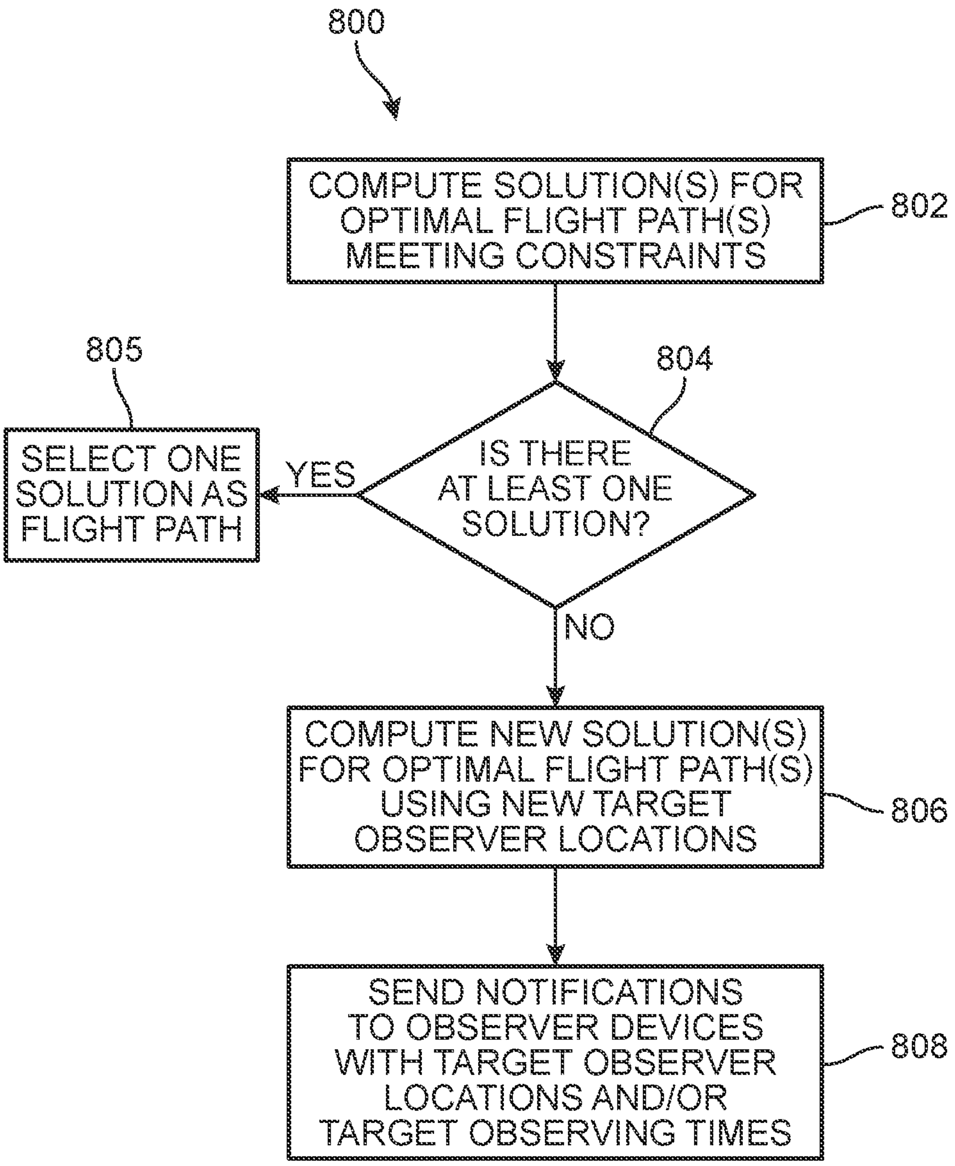
FIG. 8 is a schematic view of a process for managing scenarios where an optimal flight path cannot be found for the initial observer locations, according to an embodiment.

FIG. 8 is a schematic view of a process 800 for managing scenarios where an optimal flight path cannot be found for the initial observer locations. In some embodiments, this process may be understood as a set of sub-steps associated with step 708 of process 700.

In step 802, system 205 may compute a solution for one or more optimal flight paths that meet the provided constraints. These constraints may include, at least, line of sight constraints. Namely, the solutions are constrained so that any flight path has line of sight to at least one observer device (based on received observer locations).

In step 804, system 205 checks to see if there is at least one solution (flight path) that meets the constraints. If so, system 205 selects one solution to designate as the flight path that will be sent to the drone in step 805. When there are two or more solutions available, system 205 may use any suitable criteria for selecting one particular flight path.

If, during step 804, no solutions are found, system 205 proceeds to step 806. In step 806, system 205 may compute new solutions for optimal flight paths. More specifically, in step 806, system 205 is not constrained to use the current observer locations. Instead, system 205 may vary the observer locations until it finds new target observing locations (for one or more observers) that provide a solution for a flight path. Here, the new flight path is generated under the assumption that the observers will be located at the target observing locations.

In some embodiments, the system could also generate target observation times for each target observing location. This helps any observers know not only where they need to move to in order to observe the drone along the designated flight path, but also when they should arrive to ensure they are at the location when the drone passes by.

In step 808, the system sends notifications to observer devices with the target observing locations (and, optionally, target observation times). These notifications could comprise any information indicating a designated location for each observer. In some cases, the notifications are provided as messages on the observer's device. In other cases, the notifications could be audible. In other cases, system 205 could generate navigation instructions to the new target observing location that can be displayed on the observer's device.

The embodiments can be configured to enable dynamic changes to a flight path in real time to accommodate changes in line of sight due to unforeseen or dynamic conditions. For example, while a flight optimization system may not be aware of environmental conditions (such as fires) that may reduce visibility in an area, as the drone arrives at the area of reduced visibility the system could automatically update the flight plan to lower the drone to increase visibility with an observer. In some cases, the drone may even automatically land if it is determined that there is no feasible way to maintain the required line of sight conditions with the observer. The drone could then take off again once the observer has moved to a position where they once again have line of sight of the drone. In some embodiments, a drone could be pre-programmed to land at a closest failsafe landing station (or designated location) if the system dynamically determines that line of sight between the drone and an observer will be broken for a period exceeding a predetermined time safety threshold. During this time, observes can be redirected to enable continued line of sight after the drone takes off again.

The embodiments could also be configured to dynamically update observer directions to ensure line of sight is maintained. For example a mobile observer traveling in an automated vehicle may be intelligently turned toward a drone when there is a risk of losing line of sight with the drone. At the same time, in some cases, the drone could maneuver in a way to maintain visual line of sight. That is, the system could dynamically update both the flight path of the drone and the directions for observing location(s) in real time.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, smart surveillance cameras, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method, comprising:

receiving, by a flight path system, a first location and a second location;

identifying, by the flight path system, a set of devices disposed within a geographic region that includes the first location and the second location;

retrieving, by the flight path system, device locations for each device in the set of devices;

determining, by the flight path system using a ray-tracing algorithm, a region of visibility for each device in the set of devices based on geographic information for the geographic region;

generating, by the flight path system, a flight path for a drone between the first location and the second location, wherein generating the flight path includes using the ray-tracing algorithm to determine line of sight conditions between locations along the flight path and the device locations, and wherein the flight path is constrained such that each location along the flight path is within at least one of the regions of visibility;

sending, by the flight path system, the flight path to the drone; and flying, by the drone, along the flight path.

2. The method according to claim 1, wherein determining the region of visibility for each device includes using three-dimensional terrain modeling to account for geographic obstacles that block line of sight.

3. The method according to claim 1, wherein the ray-tracing algorithm simulates light projection through three-dimensional space to identify visibility boundaries for each device.

4. The method according to claim 1, wherein the method further includes sending a notification to at least one device in the set of devices.

5. The method according to claim 4, wherein the notification includes information about the flight path.

6. The method according to claim 4, wherein the notification includes a target observing location for the at least one device.

7. The method according to claim 1, wherein generating the flight path also includes considering a flight duration of the flight path.

8. The method according to claim 1, wherein generating the flight path also includes considering a total distance for the flight path.

9. A method, comprising:

receiving, by a flight path system, a first location and a second location;

identifying, by the flight path system, a set of devices disposed within a geographic region that includes the first location and the second location;

retrieving, by the flight path system, device locations for each device in the set of devices;

determining, by the flight path system using a ray-tracing algorithm, a region of visibility for each device in the set of devices based on geographic information for the geographic region;

generating, by the flight path system, a target observing location for a selected device in the set of devices;

generating, by the flight path system, a flight path for a drone between the first location and the second location, wherein generating the flight path includes considering using the ray-tracing algorithm to determine line of sight conditions between locations along the flight path and the target observing location, and wherein the flight path is constrained such that each location along the flight path is within at least one of the regions of visibility;

sending, by the flight path system, a message including the target observing location to the selected device;

sending, by the flight path system, the flight path to the drone; and flying, by the drone, along the flight path.

10. The method according to claim 9, wherein the method includes sending a target observation time with the target observing location to the selected device, and wherein the flight path is generated assuming that the selected device will be at the target observing location during the target observation time.

11. The method according to claim 9, wherein the method includes sending information about the flight path to the selected device.

12. The method according to claim 9, wherein generating the flight path also includes considering a flight duration of the flight path.

13. The method according to claim 9, wherein generating the flight path also includes considering a total distance for the flight path.

14. A drone, comprising:

one or more processors; and a non-transitory computer-readable media storing instructions that are can be executed by the one or more processors to:

receive a first location and a second location;

identify a set of devices disposed within a geographic region that includes the first location and the second location;

retrieve device locations for each device in the set of devices;

determine, using a ray-tracing algorithm, a region of visibility for each device in the set of devices based on geographic information for the geographic region;

generate a flight path for a drone between the first location and the second location, wherein generating the flight path includes using the ray-tracing algorithm to determine line of sight conditions between locations along the flight path and the device locations, and wherein the flight path is constrained such that each location along the flight path is within at least one of the regions of visibility; and control the drone to fly along the flight path.

15. The system according to claim 14, wherein the set of devices are associated with a predetermined network of observers that observe drone flights.

16. The drone according to claim 14, wherein the flight path comprises a three-dimensional path through space between the first location and the second location.

17. The drone according to claim 14, wherein the instructions are further executable to send notifications to one or more devices in the set of devices.

18. The drone according to claim 17, wherein the notifications include information about the flight path.

19. The drone according to claim 17, wherein the notifications include a target observing location.

20. The drone according to claim 14, wherein the ray-tracing algorithm simulates light rays through three-dimensional space to determine visibility boundaries around geographic obstacles.

* * * * *